(12) United States Patent
Ashlock et al.

(10) Patent No.: US 12,212,477 B2
(45) Date of Patent: *Jan. 28, 2025

(54) END-TO-END DISTRIBUTED TRACING WITH EXTERNAL TELEMETRY DATA

(71) Applicant: Cisco Technology, Inc., San Jose, CA (US)

(72) Inventors: Hans F. Ashlock, Berkeley, CA (US); Cameron Esdaile, Mosman (AU); Walter T. Hulick, Jr., Pearland, TX (US); Carlos M. Pignataro, Cary, NC (US); Renato Quedas, Chicago, IL (US)

(73) Assignee: CISCO TECHNOLOGY, INC., San Jose, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/488,407

(22) Filed: Oct. 17, 2023

(65) Prior Publication Data

US 2024/0064075 A1  Feb. 22, 2024

Related U.S. Application Data

(63) Continuation of application No. 17/743,870, filed on May 13, 2022, now Pat. No. 11,882,012.

(51) Int. Cl.
*H04L 43/10* (2022.01)
*H04L 43/045* (2022.01)
(Continued)

(52) U.S. Cl.
CPC ........ *H04L 43/045* (2013.01); *H04L 43/0817* (2013.01); *H04L 43/10* (2013.01); *H04L 43/12* (2013.01)

(58) Field of Classification Search
CPC ... H04L 43/045; H04L 43/0817; H04L 43/10; H04L 43/12
(Continued)

(56) References Cited

U.S. PATENT DOCUMENTS 10,608,931 B1  3/2020  Kumar et al.
11,665,078 B1  5/2023  Ashlock et al.
(Continued)

FOREIGN PATENT DOCUMENTS

WO   2020229635 A1   11/2020

OTHER PUBLICATIONS

OpenTelemetry, "Data Sources," https://opentelemetry.io/docs/concepts/data-sources/#traces, Last modified Nov. 12, 2021, retrieved from Internet Apr. 4, 2022, 4 pages.
(Continued)

*Primary Examiner* — Meng Vang
(74) *Attorney, Agent, or Firm* — Edell, Shapiro & Finnan, LLC

(57) ABSTRACT

Techniques are described for generating an end-to-end distributed trace in connection with a cloud or datacenter environment. In one example, a server obtains target application telemetry data and external telemetry data associated with one or more correlation identifiers included in one or more network communications provided to a target application in the cloud or datacenter environment. The server aggregates the target application telemetry data and the external telemetry data based on the one or more correlation identifiers to generate an end-to-end distributed trace associated with the one or more network communications.

20 Claims, 7 Drawing Sheets

(51) Int. Cl.
  *H04L 43/0817* (2022.01)
  *H04L 43/12* (2022.01)
(58) Field of Classification Search
  USPC ........................................................ 709/224
  See application file for complete search history.

(56) References Cited

U.S. PATENT DOCUMENTS

| | | | |
|---|---|---|---|
| 2006/0129885 | A1 | 6/2006 | Bozak et al. |
| 2007/0192474 | A1 | 8/2007 | Decasper et al. |
| 2007/0266148 | A1 | 11/2007 | Ruiz et al. |
| 2012/0170470 | A1 | 7/2012 | Duchenay et al. |
| 2014/0297846 | A1 | 10/2014 | Hoja et al. |
| 2016/0352608 | A1 | 12/2016 | Cornell et al. |
| 2017/0005887 | A1 | 1/2017 | Lad et al. |
| 2017/0076479 | A1 | 3/2017 | Benavides et al. |
| 2017/0161167 | A1 | 6/2017 | Obermiller et al. |
| 2017/0337122 | A1 | 11/2017 | Bolajwar et al. |
| 2018/0077026 | A1 | 3/2018 | Li et al. |
| 2018/0083849 | A1 | 3/2018 | Droux et al. |
| 2019/0045412 | A1 | 2/2019 | Shivam et al. |
| 2020/0195735 | A1 | 6/2020 | Greifeneder et al. |
| 2020/0328952 | A1 | 10/2020 | Makwarth et al. |
| 2020/0379875 | A1 | 12/2020 | Krishnaswamy et al. |
| 2021/0019209 | A1 | 1/2021 | Krishnaswamy et al. |
| 2021/0135967 | A1 | 5/2021 | Iorga et al. |
| 2022/0050902 | A1 | 2/2022 | Hulick |
| 2022/0058042 | A1 | 2/2022 | Vanjare et al. |
| 2022/0121556 | A1 | 4/2022 | Guim Bernat et al. |
| 2022/0174012 | A1 | 6/2022 | Deshmukh et al. |
| 2022/0210035 | A1 | 6/2022 | Hendrickson et al. |
| 2022/0217116 | A1 | 7/2022 | Schachter et al. |
| 2022/0222359 | A1 | 7/2022 | Doshi et al. |

OTHER PUBLICATIONS

MDN Web Docs, "X-Forwarded-For," https://developer.mozilla.org/en-US/docs/Web/HTTP/Headers/X-Forwarded-For., Last modified: Apr. 18, 2022, retrieved from Internet Apr. 25, 2022, 7 pages.

MDN Web Docs, "X-Forwarded-Proto," https://developer.mozilla.org/en-US/docs/Web/HTTP/Headers/X-Forwarded-Proto., Last modified: Apr. 18, 2022, retrieved from Internet Apr. 25, 2022, 4 pages.

Wikipedia, "List of HTTP header fields," https://en.wikipedia.org/wiki/List_of_HTTP_header_fields., last edited Apr. 2, 2022, retrieved from Internet Apr. 4, 2022, 11 pages.

Kayce Basques et al., "Network features reference," Chrome Developers, https://developer.chrome.com/docs/devtools/network/reference, published Apr. 13, 2015, updated Apr. 1, 2022, retrieved from Internet Apr. 4, 2022, 44 pages.

Datadog, "Synthetic Monitoring—API and Browser Testing," https://www.datadoghq.com/product/synthetic-monitoring/, Datadog 2022, Mar. 7, 2022, 7 pages.

Salman Taherizadeh et al., "Monitoring self-adaptive applications within edge computing frameworks: A state-of-the-art review," Elsevier Inc., The Journal of Systems and Software 136 (2018), Available online Nov. 2, 2017, 20 pages.

Datadog, "What is Distributed Tracing? How it Works & Use Cases," https://www.datadoghq.com/knowledge-center/distributed-tracing/, Datadog 2022, Mar. 9, 2022, 8 pages.

OpenTelemetry Docs, "Tracing," Lightstep, Inc.; https://opentelemetry.lightstep.com, Mar. 9, 2022, 23 pages.

OpenTelemetry, "Resource Semantic Conventions," https://opentelemetry.io/docs/reference/specification/resource/semantic_conventions/, retrieved from Internet Apr. 4, 2022, 7 pages.

W3C, "Trace Context", https://www.w3.org/TR/trace-context/#traceparent-header, Nov. 23, 2021, 17 pages.

END-TO-END DISTRIBUTED TRACING WITH EXTERNAL TELEMETRY DATA

CROSS-REFERENCE TO RELATED APPLICATIONS

This application is a continuation of U.S. patent application Ser. No. 17/743,870, filed May 13, 2022, the entirety of which is incorporated herein by reference.

TECHNICAL FIELD

The present disclosure relates to computer networking.

BACKGROUND

Today, application owners commonly arrange for cloud or datacenter operators to run applications in cloud or datacenter environments. This permits the application owners to devote resources to maintaining and improving the cloud- or datacenter-native applications themselves, while the cloud or datacenter operators manage the environments in which the applications are running. End users can access applications hosted in cloud or datacenter environments via the Internet.

DESCRIPTION OF EXAMPLE EMBODIMENTS

Overview

Techniques are described herein for generating an end-to-end distributed trace in connection with a cloud or datacenter environment. In one example embodiment, a server obtains target application telemetry data and external telemetry data associated with one or more correlation identifiers included in one or more network communications provided to a target application in the cloud or datacenter environment. The server aggregates the target application telemetry data and the external telemetry data based on the one or more correlation identifiers to generate an end-to-end distributed trace associated with the one or more network communications.

EXAMPLE EMBODIMENTS

Figure 1:
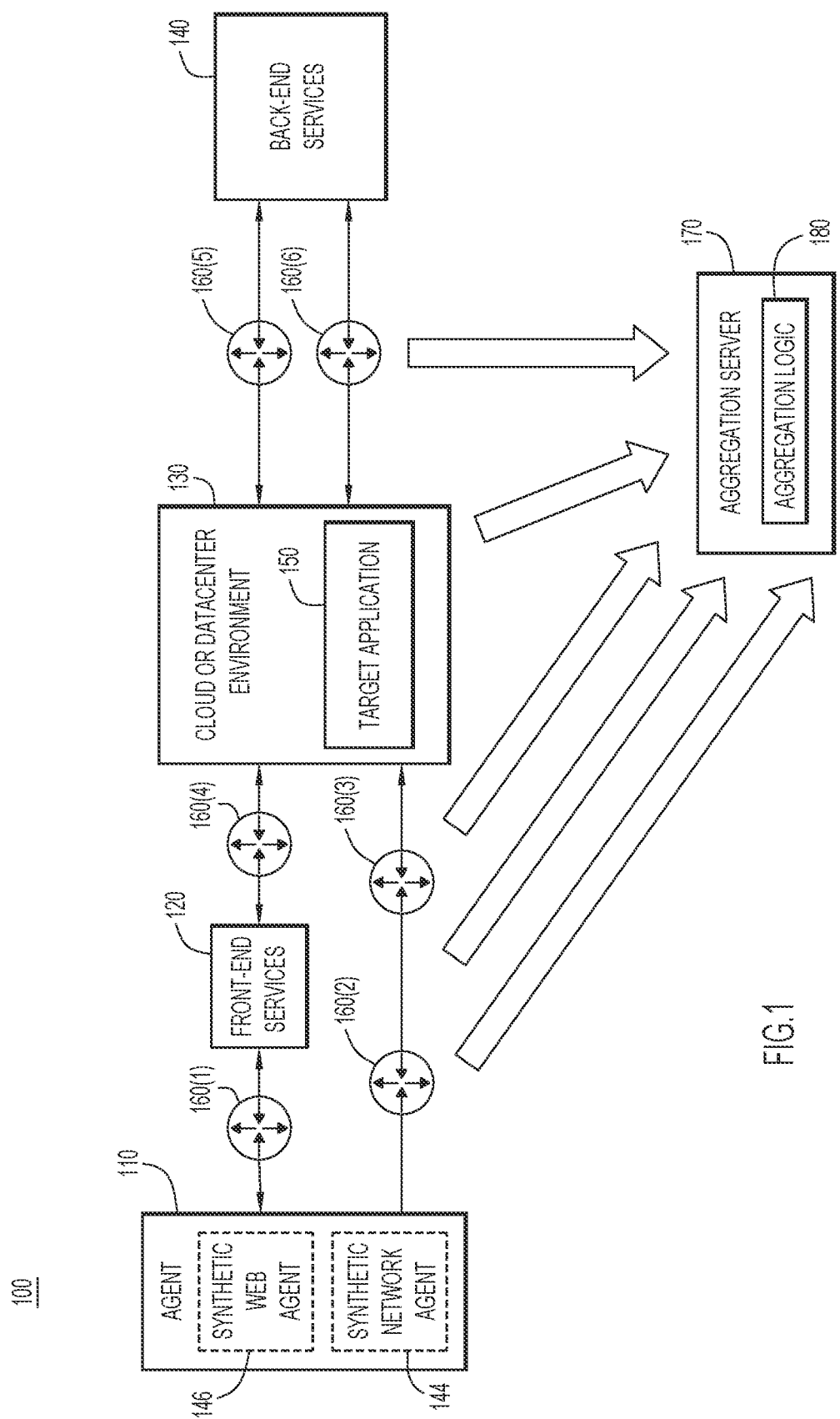
FIG. 1 illustrates a system configured for end-to-end distributed tracing, according to an example embodiment.

FIG. 1 illustrates a system 100 configured for end-to-end distributed tracing, according to an example embodiment. System 100 includes agent 110, front-end services 120, cloud or datacenter environment 130, and back-end services 140. Agent 110, which may be a synthetic tracing agent, includes synthetic network agent 144 and/or synthetic web agent 146. Cloud or datacenter environment 130 hosts target/primary application 150. System 100 also includes network nodes 160(1)-160(6) (e.g., routers, switches, etc.) configured to transmit network communications between agent 110, front-end services 120, cloud or datacenter environment 130, and back-end services 140 (e.g., over the Internet).

Agent 110 may be a remote/external, synthetic, dedicated test device. Front-end services 120 and back-end services 140 may be configured to help establish and maintain connections between end users (and/or agent 110) and target application 150. Front-end services 120 may include Domain Name System (DNS) services, Content Delivery Networks (CDNs), authentication services (e.g., Identity Provider (IdP) services), framework provider services, Secure Access Service Edge (SASE), adware, etc. Back-end services 140 may include cloud and Internet services such as cloud Application Programming Interface (API) services.

In one example, cloud or datacenter environment 130 may be a Kubernetes® environment. Target application 150 may be a web or mobile application. Target application 150 may include multiple components/routines/microservices that are connected within cloud or datacenter environment 130. The microservices may include a front-end microservice, an ad microservice, a checkout microservice, an email microservice, a payment microservice, a shipping microservice, a currency microservice, a product catalog microservice, a recommendation microservice, and a cart microservice configured to utilize a cache. In operation, the front-end service may obtain incoming application requests (e.g., Hypertext Transfer Protocol (HTTP) requests), such as web user requests, from the load generator and/or the Internet. For example, the application requests may correspond to an end user purchase, and the microservices within cloud or datacenter environment 130 may perform one or more respective operations to fulfill the end user purchase.

To measure the performance of target application 150 and the corresponding microservices, engineers/operators associated with target application 150 might employ distributed tracing techniques. However, conventional distributed tracing techniques are limited to monitoring performance of target application 150 within cloud or datacenter environment 130 for a given application request. Thus, conventional distributed tracing techniques cannot provide performance visibility for an application request outside the cloud or datacenter stack of target application 150.

In particular, conventional distributed tracing techniques have significant "blind spots" at agent 110, front-end services 120, and back-end services 140. These blind spots also exist at the non-trivial network paths comprising network nodes 160(1)-160(6), including the network paths between agent 110 and front-end services 120, agent 110 and cloud or datacenter environment 130, front-end services 120 and cloud or datacenter environment 130, and cloud or datacenter environment 130 and back-end services 140. These blind spots are not traceable; that is, conventional distributed tracing techniques cannot integrate trace metrics to cover these blind spots with trace metrics generated within cloud or datacenter environment 130. As a result, conventional distributed tracing techniques provide limited value to the engineers/operators, because the performance of target application 150 can, from an end-user perspective, be significantly impacted by these blind spots.

Thus, to provide end-to-end distributed tracing for a given application request, aggregation server 170 is provided with aggregation logic 180. Briefly, aggregation logic 180 may enable aggregation server 170 to stitch together data from agent 110, front-end services 120, back-end services 140, and/or network nodes 160(1)-160(6), with data from the cloud or datacenter environment 130 to improve end-to-end application tracing and performance.

In one example, aggregation server 170 may obtain target application telemetry data and external telemetry data associated with one or more correlation identifiers. The one or more correlation identifiers may be included in one or more network communications provided to target application 150 (e.g., from agent 110). Based on the one or more correlation identifiers, aggregation server 170 may aggregate the target application telemetry data and the external telemetry data to generate an end-to-end distributed trace associated with the one or more network communications. As used herein, the term "end-to-end distributed trace" may refer to a distributed trace that incorporates both target application telemetry data and external telemetry data.

The target application telemetry data may include telemetry data relating to target application 150. The external telemetry data may include telemetry data relating to entities external to target application 150 and/or cloud or datacenter environment 130. For example, the external telemetry data may relate to agent 110, front-end services 120, back-end services 140, and/or network nodes 160(1)-160(6). It will be appreciated that the end-to-end distributed trace need not necessarily incorporate external telemetry data relating to each of agent 110, front-end services 120, back-end services 140, and/or network nodes 160(1)-160(6)—the end-to-end distributed trace may, for example, incorporate external telemetry data relating to one or more of agent 110, front-end services 120, back-end services 140, and/or network nodes 160(1)-160(6).

In one example, the external telemetry data may include network path telemetry data and/or external service telemetry data. The network path telemetry data may include telemetry data associated with the network path between agent 110 and cloud or datacenter environment 130. The network path telemetry data may be obtained from network nodes 160(2) and/or 160(3) (e.g., hop-by-hop data). The external service telemetry data may include telemetry data associated with front-end services 120, back-end services 140, and/or the network paths between agent 110 and front-end services 120, between front-end services 120 and cloud or datacenter environment 130, and/or between cloud or datacenter environment 130 and back-end services 140. The external service telemetry data may be obtained from front-end services 120, back-end services 140, and/or network nodes 160(1), 160(4), 160(5), and/or 160(6) (e.g., hop-by-hop data). In a further example, the external telemetry data may include service chain/service function telemetry data.

The end-to-end distributed trace may start with an external request originating from agent 110, rather than when the request reaches target application 150. The end-to-end distributed trace may also indicate the full end-to-end timing of application workloads from external locations (e.g., frontend services 120 and back-end services 140) and each relevant network hop (e.g., network nodes 160(1)-160(6)). Thus, aggregation server 170 may aggregate the portion of the application and network performance between agent 110 and the front door of target application 150, as well as other telemetry data, with the target application telemetry data to create an end-to-end view of application and network performance in Full-Stack Observability (FSO) tools.

For each application request sent to target application 150, the performance of the microservices that are involved in responding to the application request may be monitored. The resulting end-to-end distributed trace may provide Site Reliability Engineering (SRE) entities, cloud operators, engineers, and Information Technology (IT)/application teams with end-to-end distributed integrated tracing metrics that cover the full scope of, and offer granular visibility into, system 100. This may ultimately improve manual and/or automated troubleshooting and optimization of target application 150.

In one example, based on the end-to-end distributed trace, aggregation server 170 may automatically implement a network configuration change in cloud or datacenter environment 130. For example, if a given service in front-end services 120 or back-end services 140 has a long latency, aggregation server 170 may automatically cause an alternative service with a shorter latency to be used instead. Or, if a given network path has a long latency, aggregation server 170 may automatically cause an alternative network path with a shorter latency to be used instead. Other embodiments may be envisioned.

Figure 2:
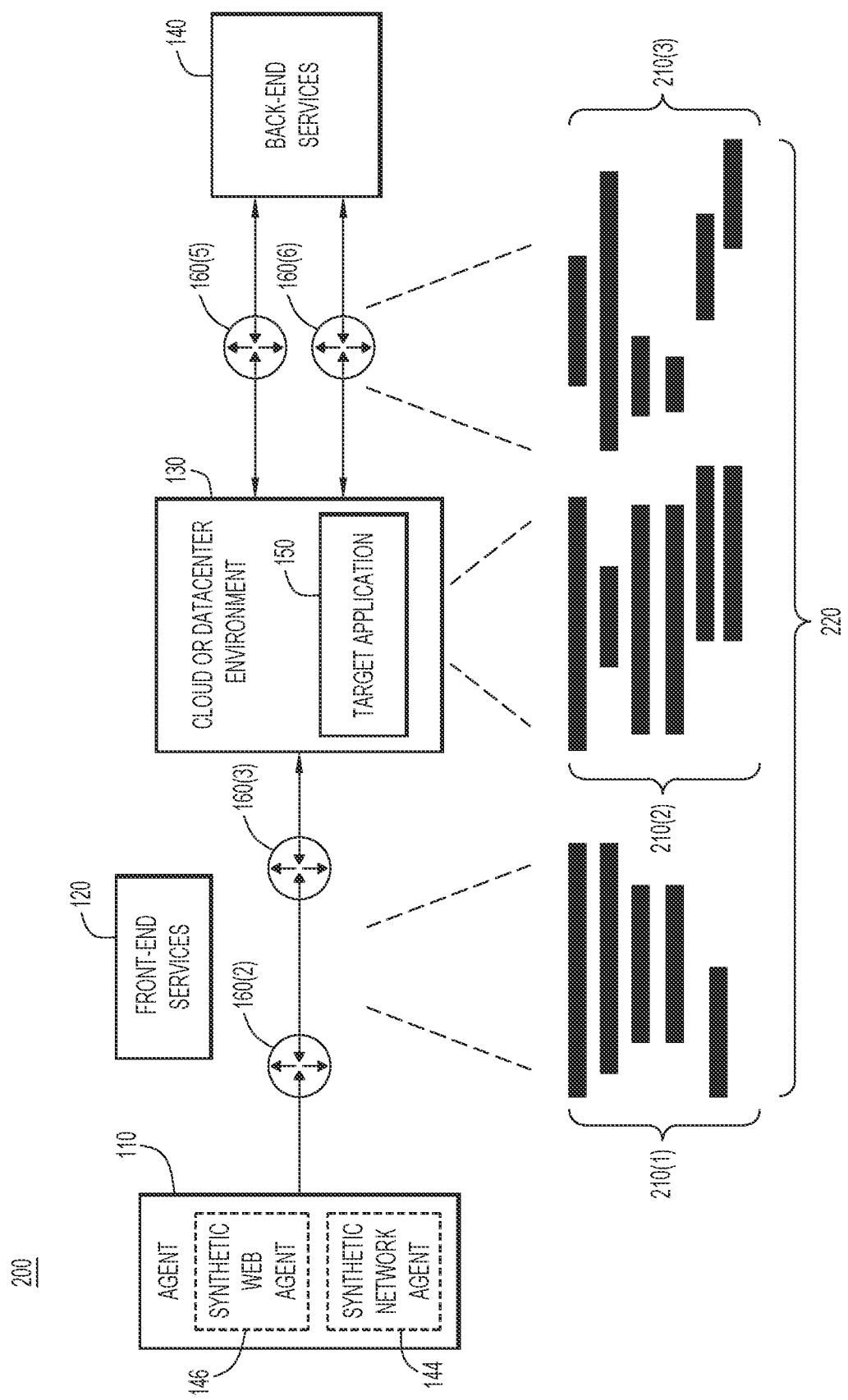
FIG. 2 illustrates a graphical depiction of how components of the system of FIG. 1 can contribute to an end-to-end distributed trace, according to an example embodiment.

With continuing reference to FIG. 1, FIG. 2 illustrates a graphical depiction 200 of how components of system 100 can contribute to an end-to-end distributed trace, according to an example embodiment. Graphical depiction 200 illustrates agent 110, front-end services 120, cloud or datacenter environment 130, and back-end services 140. Graphical depiction 200 further shows network path telemetry data 210(1) obtained from network nodes 160(2) and 160(3); target application telemetry data 210(2) obtained from microservices in target application 150; and external service telemetry data 210(3) obtained from network nodes 160(5) and 160(6). Network path telemetry data 210(1), target application telemetry data 210(2), and external service telemetry data 210(3) (collectively, "telemetry data 210(1)-210(3)"), may reflect one or more operations performed by network nodes 160(2) and 160(3), the microservices, and network nodes 160(5) and 160(6). Each of the one or more operations may have an associated timestamp.

Upon obtaining telemetry data 210(1)-210(3), aggregation server 170 may determine that telemetry data 210(1)-210(3) are correlated (e.g., based on one or more correlation identifiers associated with telemetry data 210(1)-210(3)), and aggregate telemetry data 210(1)-210(3) into end-to-end distributed trace 220. For example, aggregation server 170 may arrange the one or more operations by timestamp. It will be appreciated that any suitable combination of telemetry data may be aggregated into end-to-end distributed trace 220. For instance, in other examples, front-end services 120 and/or back-end services 140 may provide, to aggregation server 170, further external service telemetry data which may be aggregated into end-to-end distributed trace 220.

It will be appreciated that the techniques described herein may be compatible with any suitable mechanism for collecting telemetry data. One such mechanism may be the OpenTelemetry tracing specification. The OpenTelemetry tracing specification specifies a collection of tools, APIs, and Software Development Kits (SDKs) that are useful to generate, collect, and export telemetry data (metrics, logs, and traces) to analyze software performance. With OpenTelemetry technology, distributed tracing may involve measuring the performance and behavior of complex, distributed software systems using the concepts of spans and traces. A span may represent an individual unit of work (e.g., one or more operations) performed by a microservice involved in fulfilling an application request. A trace may include one or more spans, and may represent the processing of an application request by an application and corresponding microservices required to fulfill the request. Spans and traces may help measure the duration of the corresponding units of work and, therefore, the duration of application request processing within the application. OpenTelemetry data may be provided by entities referred to as resources.

The techniques described herein may use a tracing tool such as the OpenTelemetry tracing specification to automatically generate both internal application traces as well as external network performance (e.g., external network paths) and external network service traces (e.g., DNS traces), and aggregate the resulting external network performance and external service data with the resulting application-oriented distributed tracing data. Thus, using a synthetic web agent and a synthetic network agent, end-to-end distributed application traces may be created which broaden the scope and effectiveness of existing observability tools such as the OpenTelemetry tracing specification.

Figure 3:
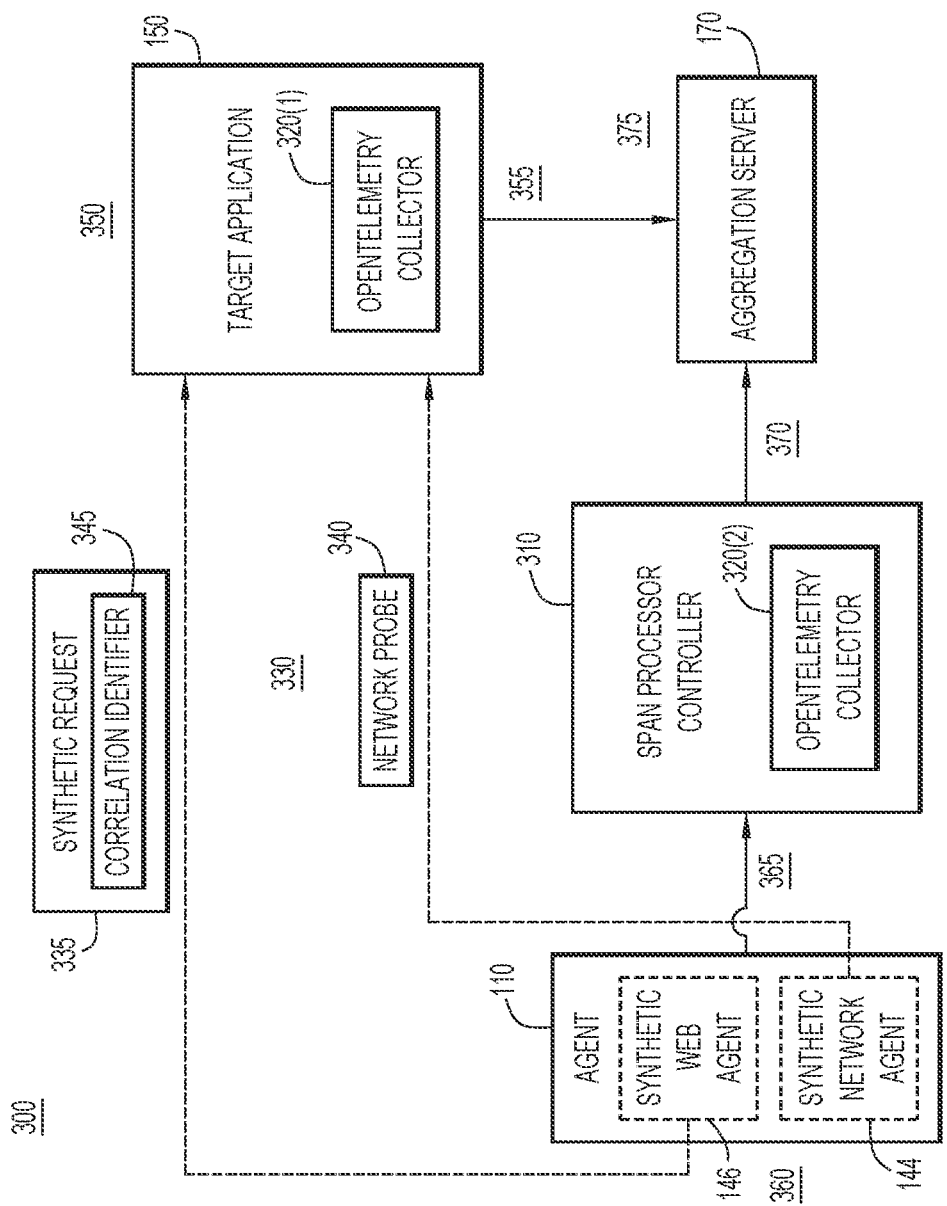
FIG. 3 illustrates a system configured for end-to-end distributed tracing using techniques specified by the OpenTelemetry™ tracing specification, according to an example embodiment.

With continuing reference to FIG. 1, FIG. 3 illustrates a system 300 configured for end-to-end distributed tracing using techniques specified by the OpenTelemetry tracing specification, according to an example embodiment. System 300 includes agent 110 (including synthetic network agent 144 and/or synthetic web agent 146), target application 150, aggregation server 170, and span processor controller 310. Target application 150 and span processor controller 310 include OpenTelemetry collectors 320(1) and 320(2), respectively. OpenTelemetry collectors 320(1) and 320(2) may be configured to generate distributed tracing data.

In this example, target application 150 has a Uniform Resource Locator (URL) of "my.app.com." Agent 110 may be a ThousandEyes® agent, and span processor controller 310 may be a ThousandEyes collector. The ThousandEyes software monitoring platform may provide visibility and enable actions to maintain and optimize digital services, such as application experience, hop-by-hop network path, and performance. The ThousandEyes software monitoring platform provides visibility from an end-user to an application, over a network. Furthermore, aggregation server 170 may be an OpenTelemetry back-end configured to aggregate OpenTelemetry data and display the aggregated data using a visualization tool such as the AppDynamics® application performance management platform and solution.

At operation 330, agent 110 provides, to target application 150, one or more network communications. The one or more network communications comprise synthetic request 335 and network probe 340. Synthetic request 335 may be a browser-based, application-layer, HTTP web request (e.g., an HTTP GET) configured to initiate an HTTP transaction on target application 150. In one example, synthetic request 335 may be generated and sent by synthetic web agent 146, and network probe 340 may be generated and sent by synthetic network agent 144.

To provide synthetic request 335, synthetic web agent 146 may create a new distributed trace span object associated with synthetic request 335. The span object may include span context (e.g., cross-layer context) including a unique span identifier that can be used to uniquely identify the span object (e.g., a root span). The span object may also include trace context including correlation identifier 345. In one example, correlation identifier 345 may be a unique trace identifier of an end-to-end distributed trace associated with the one or more network communications (e.g., an OpenTelemetry trace identifier configured to identify the distributed trace root span). The unique trace identifier may be created because the root span, initiated by synthetic web agent 146, is the first span in (e.g., represents the start of) the end-to-end distributed trace. Any subsequent spans in the end-to-end distributed trace may be child spans of this root span, each child span associated with a unique span identifier.

The span object may also include other context regarding synthetic request 335 as custom OpenTelemetry properties. The custom OpenTelemetry properties may include metadata of agent 110, such as an identifier (e.g., name) of agent 110, a location (e.g., a geolocation, such as city, state, country, metro region, etc. and/or a geotag, such as latitude/longitude) of agent 110, a service provider (e.g., network provider or Internet Service Provider (ISP)) of agent 110, host/provider network of agent 110, etc. The custom OpenTelemetry properties may further include a network host, the Internet Protocol (IP) address of target application 150, the URL of target application 150 ("my.app.com"), external service names and/or URLs, the identifier of the synthetic test (to allow linking back to synthetic test), and/or parameters regarding the method of transporting the telemetry data. These custom OpenTelemetry properties may be used to enrich the resulting end-to-end distributed trace.

Synthetic web agent 146 may inject correlation identifier 345 (e.g., the unique trace identifier), the unique span identifier of the root span, and/or the other context into synthetic request 335. Correlation identifier 345 and/or the unique span identifier may be injected in-band, using an HTTP header format that is recognizable by target application 150. In one example, correlation identifier 345 and/or the unique span identifier may be injected into a World Wide Web Consortium (W3C) trace context HTTP header, which may be compatible with distributed tracing frameworks like techniques specified by the OpenTelemetry tracing specification. In another example, the correlation identifier 345 and/or the unique span identifier may be embedded into the payload of synthetic request 335.

Synthetic request 335 may simulate an end user action on a browser, such as selecting (e.g., clicking on) a few products and placing an order. But, instead of simply mimicking what an end user would do, the synthetic test initiated by synthetic web agent 146 may also involve injecting correlation identifier 345 and/or other trace data to enable end-to-end distributed tracing.

Synthetic network agent 144 may send network probe 340 to the Internet Protocol (IP) address and/or hostname of target application 150. Network probe 340 may be sent out-of-band with respect to synthetic request 335. Synthetic network agent 144 may generate and/or provide network probe 340 to target application 150 before, while, or after synthetic web agent 146 generates and/or provides synthetic request 335 to target application 150. In one specific example, agent 110 may embed correlation identifier 345 in synthetic request 335 while simultaneously generating network probe 340. In another specific example, agent 110 may generate network probe 340 while target application 150 is processing synthetic request 335.

Synthetic network agent 144 may tag network probe 340 with an identifier that enables correlation with synthetic request 335. In one example, synthetic network agent 144 may tag or inject network probe 340 with correlation identifier 345. In another example, synthetic network agent 144 may tag network probe 340 with another correlation identifier that is associated with correlation identifier 345. In this example, correlation identifier 345 may be associated with target application telemetry data that is generated responsive to synthetic request 335, and the other correlation identifier may be associated with external telemetry data that is generated responsive to one or more network probes (e.g., network probe 340). In still another example, correlation identifier 345 or the other correlation identifier may be tagged/assigned to the network telemetry data collected by agent 110, responsive to network probe 340, for later correlation with the target application telemetry data. Correlation identifier 345 and the other correlation identifier may be associated with each other to enable correlation of the target application telemetry data and the external telemetry data in an end-to-end distributed trace.

Synthetic request 335 and network probe 340 may act as distributed tracing resources, e.g., participants in networking operations. Synthetic request 335 and network probe 340 may generate telemetry data depending on the performance metrics that synthetic request 335 and network probe 340 are configured to measure. Examples of generated telemetry data may include latency, jitter, packet loss, DNS response time, Secure Sockets Layer (SSL) connection time, server response time, etc.

Synthetic request 335 may be configured to generate target application telemetry data, and network probe 340 may be configured to generate external telemetry data. In this example, network probe 340 may be configured for network performance and path discovery, and may therefore generate network path telemetry data. The network path telemetry data may include hop-by-hop data detailing the network path traveled by synthetic request 335 from agent 110 to target application 150. If synthetic request 335 and network probe 340 are provided in parallel (e.g., at the same time or nearly the same time), the network path telemetry data may represent network performance at the time (or at the approximate time) that synthetic request 335 was made.

Synthetic network agent 144 and/or target application 150 may also provide additional network probes. In one example, synthetic network agent 144 and/or target application 150 may provide additional network probes to external services such as front-end services 120 and/or back-end services 140; those additional network probes may generate external service telemetry data. In another example, synthetic network agent 144 and/or target application 150 may provide additional network probes to service functions and/or service chains; those additional network probes may generate service function/chain telemetry data.

At operation 350, target application 150 obtains synthetic request 335, and in response, generates target application telemetry data for the end-to-end distributed trace. In generating the target application telemetry data, target application 150 may handle/process synthetic request 335 similar to a request obtained from an end user, e.g., by prompting various microservices to perform one or more operations to fulfill synthetic request 335. Target application 150 may also inspect synthetic request 335 for a header (e.g., a traceparent header) that includes correlation identifier 345 and/or the span identifier.

Target application 150 may extract correlation identifier 345 from synthetic request 335 for association with any child spans generated by target application 150 as a result of processing synthetic request 335. Target application 150 may also extract the span identifier and set the span identifier as the parent span identifier for the end-to-end distributed trace. Thus, target application 150 may mark any child spans generated by target application 150 as a result of processing synthetic request 335, as child spans of the span referenced by synthetic request 335 (e.g., the span identifier).

Target application 150 may also extract other context injected into synthetic request 335, such as the identifier of agent 110, the location of agent 110, the service provider of agent 110, the IP address of target application 150, the URL of target application 150, etc. Target application 150 may forward the other context to any subsequent distributed tracing calls that will become part of the end-to-end distributed trace. In one example, target application 150 may use the OpenTelemetry open-source distributed tracing framework to extract context from synthetic request 335 and apply the context to subsequent spans generated by tracing within target application 150.

In one example, target application 150 may include a visualization agent (e.g., an AppDynamics agent) configured to extract correlation identifier 345 (and/or other context) from synthetic request 335. The visualization agent may generate OpenTelemetry spans and mark those spans as child spans of the trace identified in synthetic request 335. The visualization agent may mark those spans as child spans, rather than root spans, based on correlation identifier (e.g., the trace identifier) in synthetic request 335. The visualization agent may also ingest other context (e.g., trace context), from synthetic request 335. The visualization agent may automatically extract context from synthetic request 335, for example, when the context is present in the traceparent header.

At operation 355, aggregation server 170 obtains the target application telemetry data from target application 150 responsive to synthetic request 335. Aggregation server 170 may obtain the target application telemetry data from OpenTelemetry collector 320(1) or directly from target application 150. The target application telemetry data may include OpenTelemetry spans accumulated/generated from any instrumented distributed microservices within target application 150 that are used to process synthetic request 335. The OpenTelemetry spans may include child spans of the initial root span created by agent 110. The target application telemetry data may include correlation identifier 345.

At operation 360, agent 110 gathers external telemetry data (e.g., metrics obtained from one or more external services and/or network path/hop-by-hop data), generates one or more corresponding spans, and assigns to each span a unique span identifier. Agent 110 provides the external telemetry data (e.g., raw network probe data) to span processor controller 310 to be provided to aggregation server 170 as a single transaction. The external telemetry data may include correlation identifier 345. Agent 110 may also provide additional context, such as timestamps, location of agent 110, the service provider of agent 110, etc.

At operation 365, OpenTelemetry collector 320(2) may ingest native telemetry test data (e.g., external telemetry data) from agent 110, process the external telemetry data, and decompose (break down) the external telemetry data into multiple, individual OpenTelemetry tracing spans representing each hop and relevant external service. In one example, OpenTelemetry collector 320(2) may be running on a Software-as-a-Service (SaaS) that includes span processor controller 310.

OpenTelemetry collector 320(2) may intelligently create the OpenTelemetry spans from the extracted hop-by-hop path data and external network/HTTP service queries (e.g., DNS resolution, connect, SSL, authenticate, etc.). OpenTelemetry collector 320(2) may assign, to each span, a parent span identifier corresponding to the span identifier of the initial root span created by agent 110. As a result, the OpenTelemetry spans may be child spans of the single, root span for top-level metrics. Thus, both the child spans generated by OpenTelemetry collector 320(1) and the child spans generated by OpenTelemetry collector 320(2) may be associated with the root span identifier (and correlation identifier 345).

Alternatively, in the absence of span processor controller 310, OpenTelemetry collector 320(2) may be running on agent 110, and agent 110 may process the external telemetry data (e.g., network probe data) itself. In this example, agent 110 may break down the external telemetry data into multiple OpenTelemetry spans (e.g., one for one for each hop and a root span for top level metrics), and associate the OpenTelemetry spans with the root span identifier (and correlation identifier 345).

At operation 370, span processor controller 310 emits the OpenTelemetry spans to aggregation server 170. Alternatively, in the absence of span processor controller 310, agent 110 may generate and send the OpenTelemetry spans directly to aggregation server 170. In any event, aggregation server 170 may directly or indirectly obtain (e.g., collect) the external telemetry data from agent 110.

At operation 375, aggregation server 170 aggregates the distributed tracing span data to generate an end-to-end distributed trace associated with synthetic request 335. The distributed tracing span data may include the initial span generated by synthetic web agent 146 that corresponds to synthetic request 335, target application telemetry data obtained from OpenTelemetry collector 320(1), network path telemetry data obtained from OpenTelemetry collector 320(2), and external service telemetry data obtained from OpenTelemetry collector 320(1) and/or OpenTelemetry collector 320(2).

Aggregation server 170 may aggregate the target application telemetry data, the network path telemetry data based on correlation identifier 345. In one example, aggregation server 170 may perform the aggregation in response to obtaining the target application telemetry data with correlation identifier 345 and the network path telemetry data with correlation identifier 345. In another example, aggregation server 170 may perform the aggregation in response to obtaining the target application telemetry data with correlation identifier 345 and the network path telemetry data with another correlation identifier that is associated with correlation identifier 345. Because the OpenTelemetry spans are all correlated (directly or indirectly) to the original root span, aggregation server 170 may assemble, from these spans, the end-to-end distributed trace for synthetic request 335.

In addition to correlation identifier 345 (e.g., the unique trace identifier), a unique span identifier, and the root span identifier, one or more spans may also include additional context, such as metadata of agent 110 and/or other context. For example, one or more spans may include the identifier, location, service provider, and/or host/provider network of agent 110, and/or the network host, IP address and/or URL of target application 150, external service names and/or URLs, parameters regarding the method of transporting the telemetry data, etc.

Aggregation server 170 may associate this additional context with the end-to-end distributed trace. For example, aggregation server 170 may associate metadata of agent 110 (e.g., a location or a network service provider of agent 110) with the end-to-end distributed trace. Aggregation server 170 may configure the spans via API with the appropriate context (e.g., "correlationId," "applicationId," "transactionId," "service," etc.) to aggregate the context with the external telemetry dataset and the target application telemetry dataset (e.g., internal tracing data). Thus, aggregation server 170 may enrich the end-to-end distributed trace with the additional context such as the metadata of agent 110.

Aggregation server 170 may craft individual trace spans from hop-by-hop path data by filtering out various anomalies. For example, aggregation server 170 may parse out requests to external services extracted from HTTP request sessions (e.g., DNS lookup) and/or browser waterfall files (e.g., CDN queries, authentication, etc.).

In one example, operations 330, 350, 355, 360, 365, 370, and 375 may be repeated for any number of geographically dispersed/remote agents. For instance, multiple agents may each send a synthetic request to target application 150 and generate one or more network probes. Ultimately, aggregation server 170 may produce multiple end-to-end distribution traces, each associated with the location of a respective agent.

In another example, operations 330, 350, 355, 360, 365, 370, and 375 may be repeated over time (e.g., agent 110 may send multiple synthetic requests, etc.). Aggregation server 170 may collect corresponding OpenTelemetry spans and build multiple end-to-end distributed traces for agent 110, each corresponding to a different time.

Aggregation server 170 may display the end-to-end distributed trace to enable the owner of target application 150 to view the end-to-end distributed trace(s). For instance, the owner of target application 150 may view end-to-end distributed traces from global vantage points. The owner may parse the collection of end-to-end distributed traces based on the synthetic requests (e.g., filtering out other production/user traffic) and compare performance for different geographic regions. The display may also/alternatively enable the owner to observe how the trace topology changes over time for a given agent (e.g., agent 110).

Figure 4:
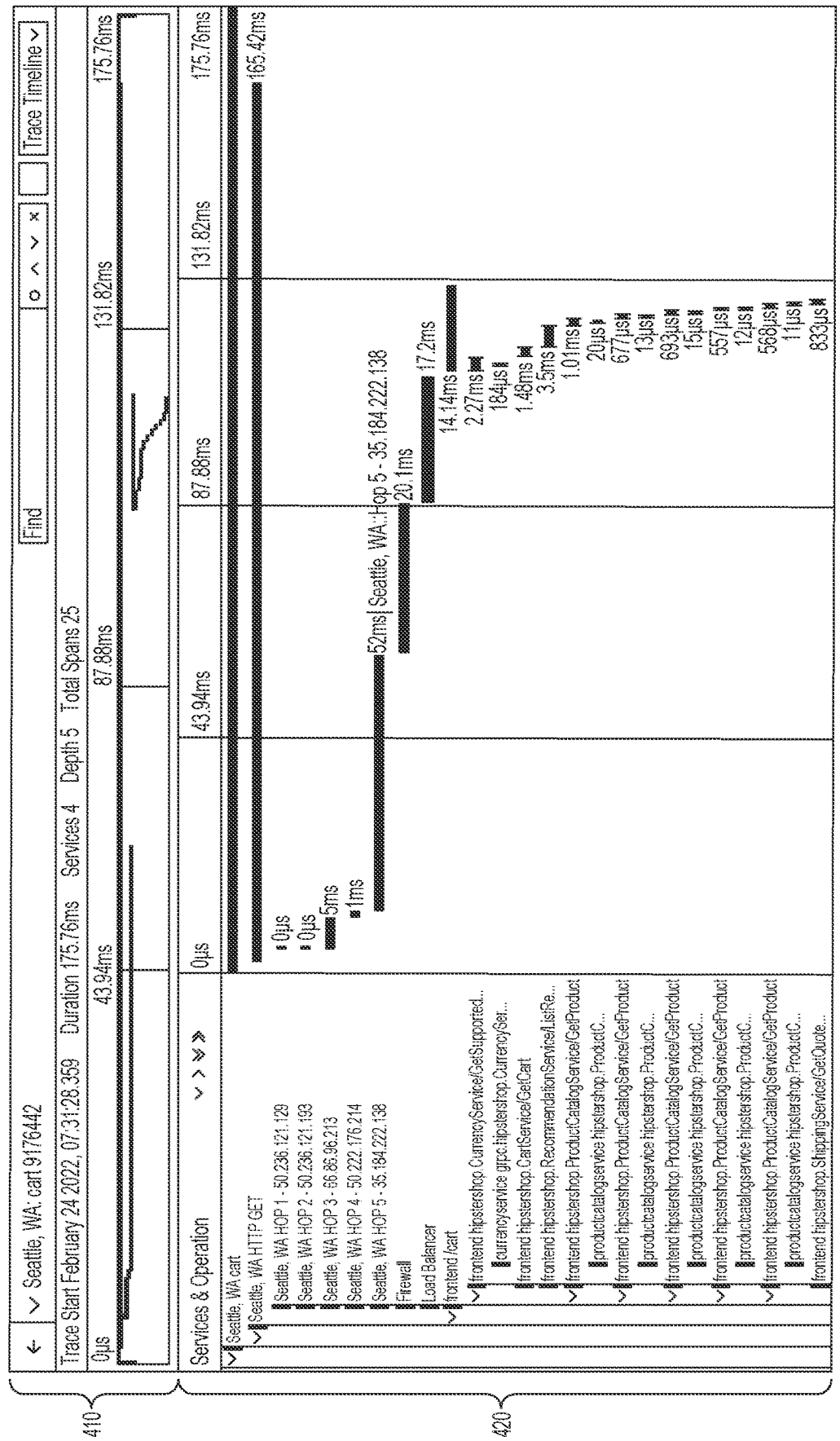
FIG. 4 illustrates a display of an end-to-end distributed trace, according to an example embodiment.

FIG. 4 illustrates a display 400 of an end-to-end distributed trace, according to an example embodiment. Display 400 may be generated by aggregation server 170. Display 400 includes overview window 410 and breakdown window 420. Overview window 410 indicates a timestamp at which the end-to-end distributed trace started (e.g., when an agent sent a synthetic request to a target application), a duration of the end-to-end distributed trace, and a total number of spans present in the end-to-end distributed trace, among other data. Overview window 410 also includes a graph displaying the entire end-to-end distributed trace.

Breakdown window 420 includes an aggregation of the spans that make up the end-to-end distributed trace, arranged in a chronological view. The spans may represent monitored performance/responses of the corresponding microservices shown under the "Service & Operation" tab. As shown, the end-to-end distributed trace may be broken down into Internet and network hops, and may include individual spans for each network hop in the path. The top span corresponding to the "cart" microservice may represent the root span; the remaining spans underneath the root span may be child spans of the root span. The end-to-end distributed trace may include the root span and the child spans. Each span in the end-to-end distributed trace may have a unique span identifier.

In this example, the end-to-end distributed trace includes network path telemetry data, corresponding to Hops 1-5, and network service (e.g., service chain/function) telemetry data, corresponding to a firewall and a load balancer. The end-to-end distributed trace also includes target application telemetry data, corresponding to frontend and associated microservices. Because the spans were generated using at least one correlation identifier (e.g., a trace identifier), the network path telemetry data and the target application telemetry data may be stitched together in a single, end-to-end distributed trace.

This "stitching" may allow engineers/operators to consume the microservices involved in responding to a given synthetic request and identify which microservice(s) might be performing poorly. For example, the end-to-end distributed trace shown in display 400 indicates that Hop 5 experienced high latency. Accordingly, an alternative network path may be manually or automatically chosen to avoid Hop 5.

Figure 5:
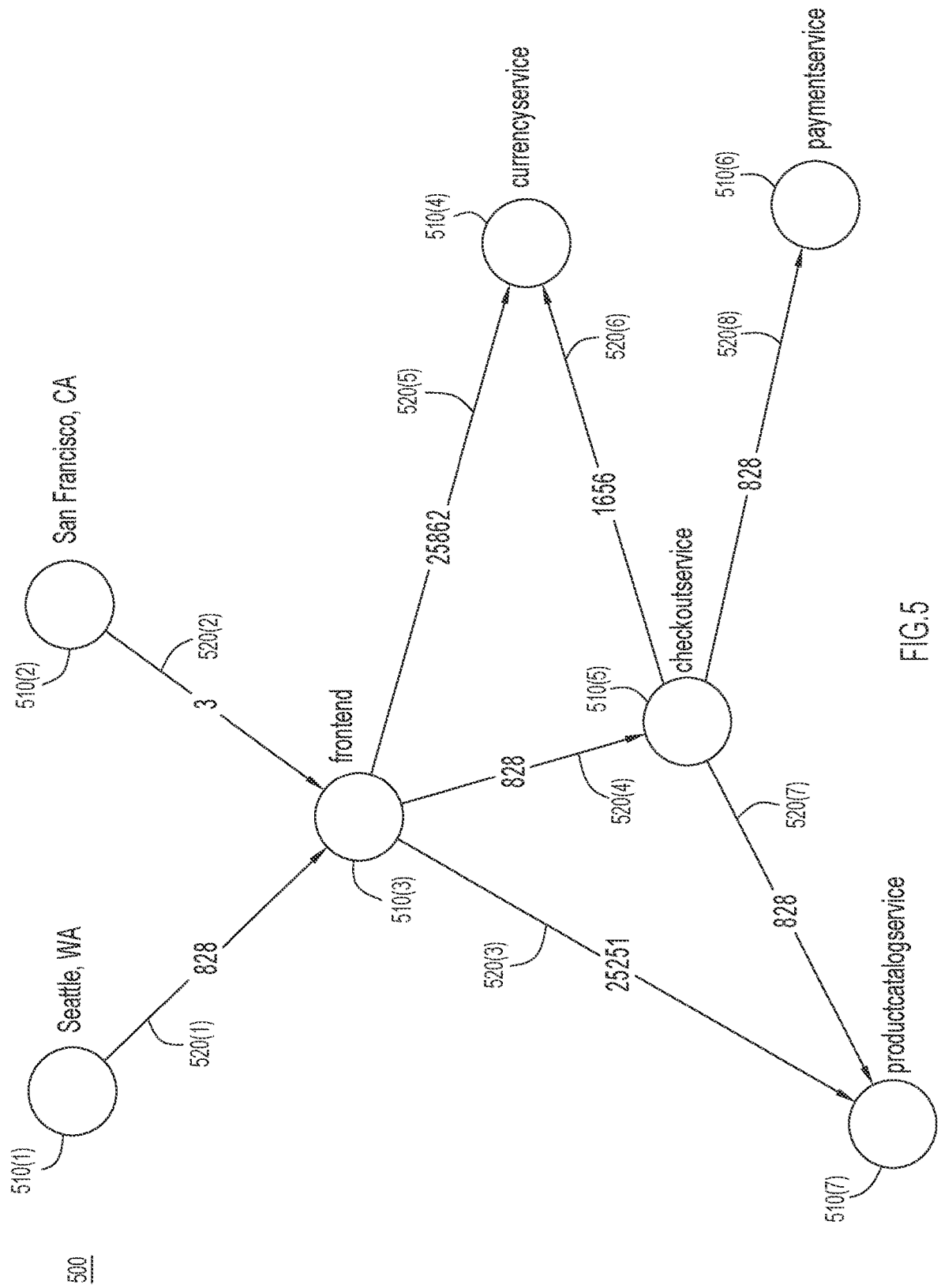
FIG. 5 illustrates a directed graph used to generate an end-to-end distributed trace, according to an example embodiment.

FIG. 5 illustrates a directed graph 500 used to generate an end-to-end distributed trace, according to an example embodiment. Directed graph 500 includes nodes 510(1)-510(7) and edges 520(1)-520(8). Nodes 510(1) and 510(2) represent agents located in Seattle, WA and San Francisco, CA, respectively, and nodes 510(3)-510(7) represent the frontend, currencyservice, checkoutservice, paymentservice, and productcatalogueservice microservices, respectively. Edges 520(1)-520(8) represent one or more network communications between nodes 510(1)-510(7). For example, edges 520(1) and 520(2) may represent respective synthetic requests, and edges 520(3)-520(8) may represent operations triggered responsive to the synthetic requests. Each edge 520(1)-520(8) is associated with a number, representing the number of operations that occur between connected pairs of nodes 510(1)-510(7). An end-to-end distributed trace may be generated based on the information in directed graph 500, such as the agents, their locations, and the one or more network communications and operations represented by edges 520(1)-520(8).

Figure 6:
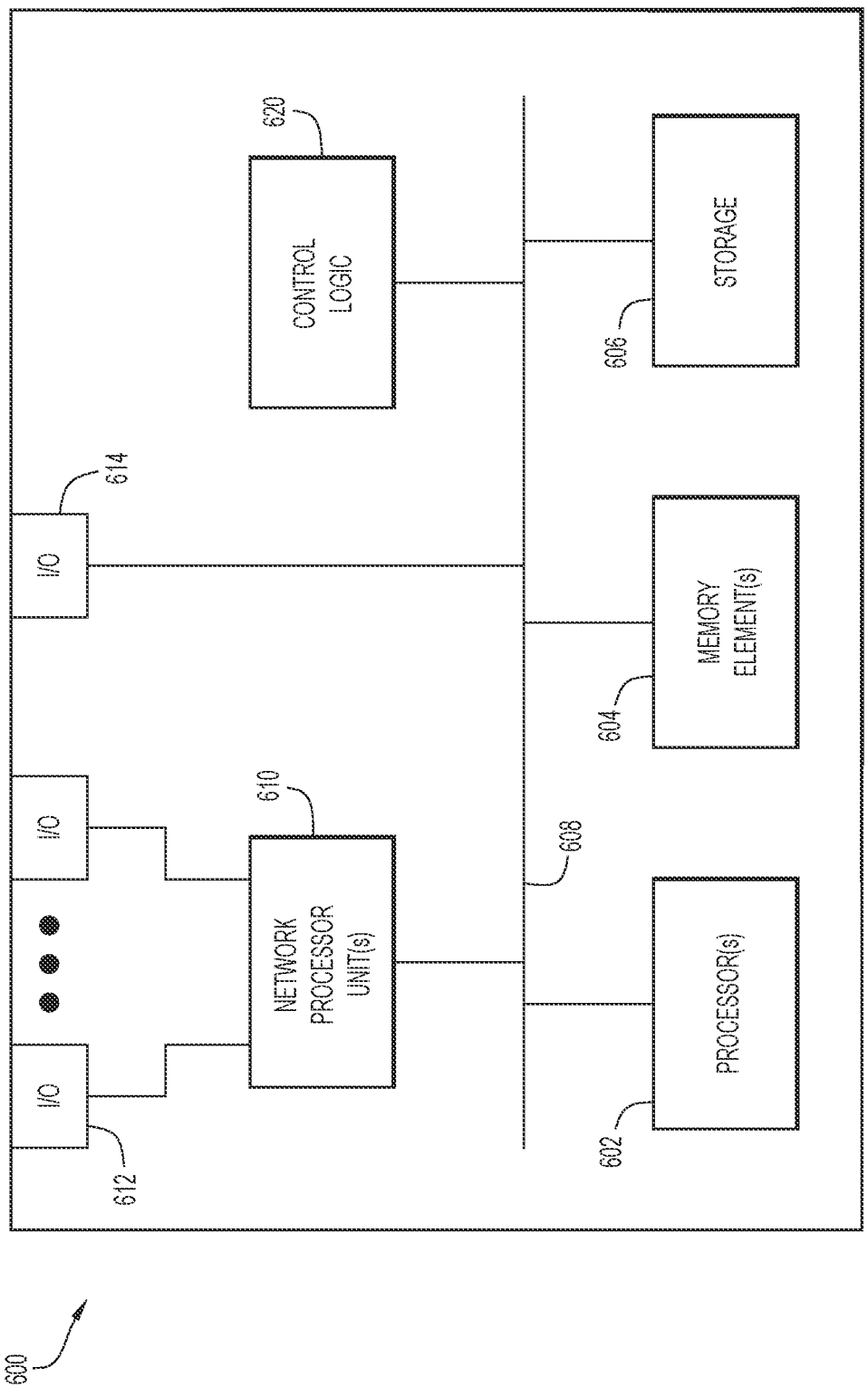
FIG. 6 illustrates a hardware block diagram of a computing device configured to perform functions associated with operations discussed herein, according to an example embodiment.

Referring to FIG. 6, FIG. 6 illustrates a hardware block diagram of a computing device 600 that may perform functions associated with operations discussed herein in connection with the techniques depicted in FIGS. 1-5. In various embodiments, a computing device, such as computing device 600 or any combination of computing devices 600, may be configured as any entity/entities as discussed for the techniques depicted in connection with FIGS. 1-5 in order to perform operations of the various techniques discussed herein.

In at least one embodiment, computing device 600 may include one or more processor(s) 602, one or more memory element(s) 604, storage 606, a bus 608, one or more network processor unit(s) 610 interconnected with one or more network input/output (I/O) interface(s) 612, one or more I/O interface(s) 614, and control logic 620. In various embodiments, instructions associated with logic for computing device 600 can overlap in any manner and are not limited to the specific allocation of instructions and/or operations described herein.

In at least one embodiment, processor(s) 602 is/are at least one hardware processor configured to execute various tasks, operations and/or functions for computing device 600 as described herein according to software and/or instructions configured for computing device 600. Processor(s) 602 (e.g., a hardware processor) can execute any type of instructions associated with data to achieve the operations detailed herein. In one example, processor(s) 602 can transform an element or an article (e.g., data, information) from one state or thing to another state or thing. Any of potential processing elements, microprocessors, digital signal processor, baseband signal processor, modem, PHY, controllers, systems, managers, logic, and/or machines described herein can be construed as being encompassed within the broad term 'processor'.

In at least one embodiment, memory element(s) 604 and/or storage 606 is/are configured to store data, information, software, and/or instructions associated with computing device 600, and/or logic configured for memory element(s) 604 and/or storage 606. For example, any logic described herein (e.g., control logic 620) can, in various embodiments, be stored for computing device 600 using any combination of memory element(s) 604 and/or storage 606. Note that in some embodiments, storage 606 can be consolidated with memory elements 604 (or vice versa), or can overlap/exist in any other suitable manner.

In at least one embodiment, bus 608 can be configured as an interface that enables one or more elements of computing device 600 to communicate in order to exchange information and/or data. Bus 608 can be implemented with any architecture designed for passing control, data and/or information between processors, memory elements/storage, peripheral devices, and/or any other hardware and/or software components that may be configured for computing device 600. In at least one embodiment, bus 608 may be implemented as a fast kernel-hosted interconnect, potentially using shared memory between processes (e.g., logic), which can enable efficient communication paths between the processes.

In various embodiments, network processor unit(s) 610 may enable communication between computing device 600 and other systems, entities, etc., via network I/O interface(s) 612 to facilitate operations discussed for various embodiments described herein. In various embodiments, network processor unit(s) 610 can be configured as a combination of hardware and/or software, such as one or more Ethernet driver(s) and/or controller(s) or interface cards, Fibre Channel (e.g., optical) driver(s) and/or controller(s), and/or other similar network interface driver(s) and/or controller(s) now known or hereafter developed to enable communications between computing device 600 and other systems, entities, etc. to facilitate operations for various embodiments described herein. In various embodiments, network I/O interface(s) 612 can be configured as one or more Ethernet port(s), Fibre Channel ports, and/or any other I/O port(s) now known or hereafter developed. Thus, the network processor unit(s) 610 and/or network I/O interfaces 612 may include suitable interfaces for receiving, transmitting, and/or otherwise communicating data and/or information in a network environment.

I/O interface(s) 614 allow for input and output of data and/or information with other entities that may be connected to computing device 600. For example, I/O interface(s) 614 may provide a connection to external devices such as a keyboard, keypad, a touch screen, and/or any other suitable input device now known or hereafter developed. In some instances, external devices can also include portable computer readable (non-transitory) storage media such as database systems, thumb drives, portable optical or magnetic disks, and memory cards. In still some instances, external devices can be a mechanism to display data to a user, such as, for example, a computer monitor, a display screen, or the like.

In various embodiments, control logic 620 can include instructions that, when executed, cause processor(s) 602 to perform operations, which can include, but not be limited to, providing overall control operations of computing device 600; interacting with other entities, systems, etc. described herein; maintaining and/or interacting with stored data, information, parameters, etc. (e.g., memory element(s), storage, data structures, databases, tables, etc.); combinations thereof; and/or the like to facilitate various operations for embodiments described herein.

The programs described herein (e.g., control logic 620) may be identified based upon application(s) for which they are implemented in a specific embodiment. However, it should be appreciated that any particular program nomenclature herein is used merely for convenience; thus, embodiments herein should not be limited to use(s) solely described in any specific application(s) identified and/or implied by such nomenclature.

In various embodiments, entities as described herein may store data/information in any suitable volatile and/or non-volatile memory item (e.g., magnetic hard disk drive, solid state hard drive, semiconductor storage device, Random Access Memory (RAM), Read Only Memory (ROM), Erasable Programmable ROM (EPROM), Application Specific Integrated Circuit (ASIC), etc.), software, logic (fixed logic, hardware logic, programmable logic, analog logic, digital logic), hardware, and/or in any other suitable component, device, element, and/or object as may be appropriate. Any of the memory items discussed herein should be construed as being encompassed within the broad term 'memory element'. Data/information being tracked and/or sent to one or more entities as discussed herein could be provided in any database, table, register, list, cache, storage, and/or storage structure: all of which can be referenced at any suitable timeframe. Any such storage options may also be included within the broad term 'memory element' as used herein.

Note that in certain example implementations, operations as set forth herein may be implemented by logic encoded in one or more tangible media that is capable of storing instructions and/or digital information and may be inclusive of non-transitory tangible media and/or non-transitory computer readable storage media (e.g., embedded logic provided in: an ASIC, Digital Signal Processing (DSP) instructions, software [potentially inclusive of object code and source code], etc.) for execution by one or more processor(s), and/or other similar machine, etc. Generally, memory element(s) 604 and/or storage 606 can store data, software, code, instructions (e.g., processor instructions), logic, parameters, combinations thereof, and/or the like used for operations described herein. This includes memory elements 604 and/or storage 606 being able to store data, software, code, instructions (e.g., processor instructions), logic, parameters, combinations thereof, or the like that are executed to carry out operations in accordance with teachings of the present disclosure.

In some instances, software of the present embodiments may be available via a non-transitory computer useable medium (e.g., magnetic or optical mediums, magneto-optic mediums, Compact Disc ROM (CD-ROM), Digital Versatile Disc (DVD), memory devices, etc.) of a stationary or portable program product apparatus, downloadable file(s), file wrapper(s), object(s), package(s), container(s), and/or the like. In some instances, non-transitory computer readable storage media may also be removable. For example, a removable hard drive may be used for memory/storage in some implementations. Other examples may include optical and magnetic disks, thumb drives, and smart cards that can be inserted and/or otherwise connected to computing device 600 for transfer onto another computer readable storage medium.

Figure 7:
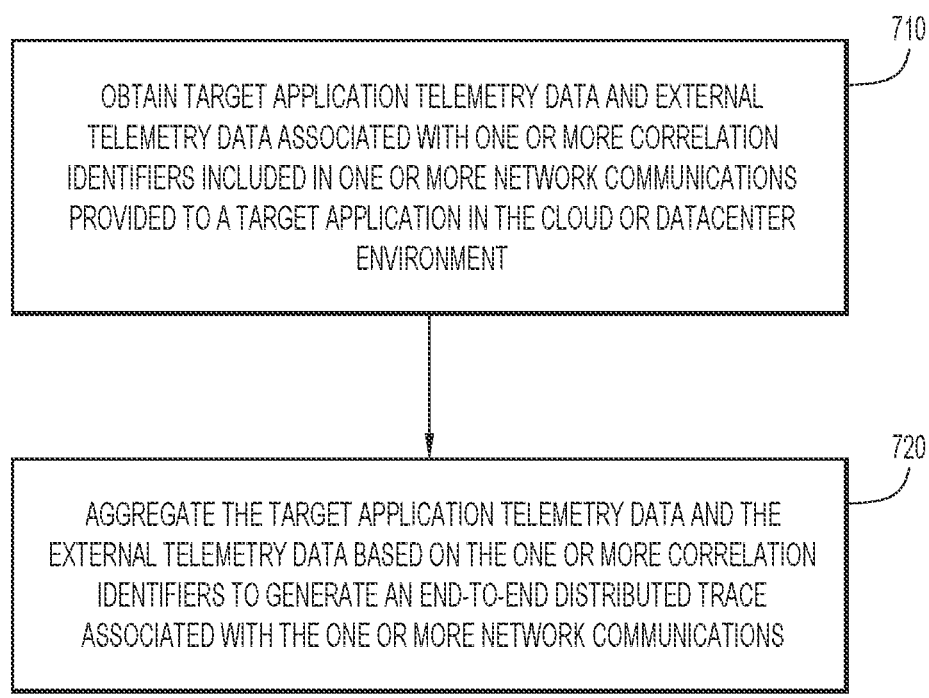
FIG. 7 illustrates a flowchart of a method for performing functions associated with operations discussed herein, according to an example embodiment.

FIG. 7 is a flowchart of an example method 700 performed in connection with a cloud or datacenter environment. Method 700 may be performed by any suitable entity, such as aggregation server 170 (FIG. 1). At operation 710, aggregation server 170 obtains target application telemetry data and external telemetry data associated with one or more correlation identifiers included in one or more network communications provided to a target application in the cloud or datacenter environment. At operation 720, aggregation server 170 aggregates the target application telemetry data and the external telemetry data based on the one or more correlation identifiers to generate an end-to-end distributed trace associated with the one or more network communications.

In one example, agents that simultaneously generate synthetic application and network probes from diverse geographic regions may be represented as resources that originate the generation of a distributed application trace. Additional application instrumentation tooling need not necessarily be added to client-side code to obtain the trace. Representing external synthetic agents as resources within a distributed trace may permit injection, into the trace/span, of context attributes of the agent (e.g., geo-location of agent/request, originating network service provider, number of network hops, type of network interface, links back to synthetic test context, etc.).

These context attributes may enrich the overall distributed trace in meaningful way, and may be otherwise unavailable an end-to-end distributed trace. This enables the application owner to make end-to-end observability queries such as, "display the traces originating from the Seattle metro region to myapp.com' for which Comcast is the ISP," or "display the end-to-end trace of requests to 'myapp.com' originating from the Chicago metro region across AT&T networks for which the purchase item business transaction exceeds normal thresholds."

As described herein, target application trace data may be aggregated with network trace data into a common distributed trace. This may involve breaking down multi-hop network path data and network service request data (e.g., DNS, connect, SSL, etc.) into distributed tracing spans that can be consumed by a framework like techniques specified by the OpenTelemetry tracing specification.

The synthetic test web (HTTP) request may be used as the vehicle for creating an association between the network trace context and the target application trace context. This approach to correlating the network context and application using HTTP injection "in-band" may obviate the need for a brute force approach (e.g., using a centralized service and API calls to create the correlation out-of-band).

The techniques described herein may enable integration/aggregation of external services, network performance data, and internal application traces with distributed tracing spans, thereby creating end-to-end distributed application traces. This may be accomplished using synthetic agents running in both external geographic locations and within a target application environment. The agents may simultaneously generate synthetic application test data, network path data, and other data using network communications sent to the target application and/or external backend services. The generated data may be converted to OpenTelemetry trace data to enable correlation of the external traces with internal application traces and thereby produce a single end-to-end trace. The end-to-end trace may be displayed/visualized in an OpenTelemetry backend tool.

The agent(s) may be represented as distributed tracing resources (e.g., OpenTelemetry resources) and provide meaningful details about themselves using OpenTelemetry resource attributes and semantics. As a result, these details may be properly identified by an OpenTelemetry backend. In one example, an end-to-end synthetic network operation may be represented by an aggregation of the basic network metrics (latency, loss, and jitter) generated by one or more network probes and devices involved in carrying the communication between two endpoints.

Synthetic network operations may be represented with OpenTelemetry traces, spans, and attributes. In one example, each synthetic network operation may be executed within the context of an OpenTelemetry trace; each probe or network device participating in the operation may be represented as an OpenTelemetry resource (e.g., source of telemetry data) within the trace; each segment of communication between probes and devices may be represented as an OpenTelemetry span; and the jitter (network.jitter) and loss (network.loss) metrics generated for each segment may be added as attributes to their respective OpenTelemetry spans, while the latency metric may be represented by both the duration/response time of the span as attributes network.latencyAvg, network.latencyMin, network.latencyMax, etc.

Techniques described herein may leverage capabilities from a synthetic application and network probing agent, (e.g., a ThousandEyes agent), distributed tracing framework (e.g., techniques specified by the OpenTelemetry tracing specification), and distributed tracing backend/visualization tools (e.g., an AppDynamics application performance management platform and solution). In one example, a ThousandEyes synthetic test agent may be used to generate external path and application trace data, and the AppDynamics application performance management platform and solution may be used to instrument applications and as an OpenTelemetry observability platform to view aggregated OpenTelemetry trace data. ThousandEyes controllers/agents may be enhanced to generate OpenTelemetry span data from synthetic test data; or, alternatively, a custom OpenTelemetry collector may be used to convert ThousandEyes agent telemetry into OpenTelemetry spans. Furthermore, application instrumentation may be enhanced to detect OpenTelemetry trace context in incoming web requests.

In accordance with techniques described herein, external service and network performance data may be captured and consumed by distributed tracing frameworks (e.g., techniques specified by the OpenTelemetry tracing specification). That data may be aggregated with typical cloud-native distributed tracing data. Synthetic test data may be generated simultaneously with path data from external locations. Synthetic testing agents may run as individual OpenTelemetry collectors configured to collect application and network metrics that may be consumed by an observability tooling/system that is based on the OpenTelemetry tracing specification. Thus, synthetic application testing and synthetic network probing technology may be integrated with distributed tracing tooling (e.g., the OpenTelemetry tracing specification) in order to make the external path and service performance data available.

Embodiments described herein may include one or more networks, which can represent a series of points and/or network elements of interconnected communication paths for receiving and/or transmitting messages (e.g., packets of information) that propagate through the one or more networks. These network elements offer communicative interfaces that facilitate communications between the network elements. A network can include any number of hardware and/or software elements coupled to (and in communication with) each other through a communication medium. Such networks can include, but are not limited to, any Local Area Network (LAN), Virtual LAN (VLAN), Wide Area Network (WAN) (e.g., the Internet), Software Defined WAN (SD-WAN), Wireless Local Area (WLA) access network, Wireless Wide Area (WWA) access network, Metropolitan Area Network (MAN), Intranet, Extranet, Virtual Private Network (VPN), Low Power Network (LPN), Low Power Wide Area Network (LPWAN), Machine to Machine (M2M) network, Internet of Things (IoT) network, Ethernet network/switching system, any other appropriate architecture and/or system that facilitates communications in a network environment, and/or any suitable combination thereof.

Networks through which communications propagate can use any suitable technologies for communications including wireless communications (e.g., 4G/5G/nG, IEEE 802.11 (e.g., Wi-Fi®/Wi-Fi6®), IEEE 802.16 (e.g., Worldwide Interoperability for Microwave Access (WiMAX)), Radio-Frequency Identification (RFID), Near Field Communication (NFC), Bluetooth™ mm.wave, Ultra-Wideband (UWB), etc.), and/or wired communications (e.g., T1 lines, T3 lines, digital subscriber lines (DSL), Ethernet, Fibre Channel, etc.). Generally, any suitable means of communications may be used such as electric, sound, light, infrared, and/or radio to facilitate communications through one or more networks in accordance with embodiments herein. Communications, interactions, operations, etc. as discussed for various embodiments described herein may be performed among entities that may be directly or indirectly connected utilizing any algorithms, communication protocols, interfaces, etc. (proprietary and/or non-proprietary) that allow for the exchange of data and/or information.

In various example implementations, entities for various embodiments described herein can encompass network elements (which can include virtualized network elements, functions, etc.) such as, for example, network appliances, forwarders, routers, servers, switches, gateways, bridges, load-balancers, firewalls, processors, modules, radio receivers/transmitters, or any other suitable device, component, element, or object operable to exchange information that facilitates or otherwise helps to facilitate various operations in a network environment as described for various embodiments herein. Note that with the examples provided herein, interaction may be described in terms of one, two, three, or four entities. However, this has been done for purposes of clarity, simplicity and example only. The examples provided should not limit the scope or inhibit the broad teachings of systems, networks, etc. described herein as potentially applied to a myriad of other architectures.

Communications in a network environment can be referred to herein as 'messages', 'messaging', 'signaling', 'data', 'content', 'objects', 'requests', 'queries', 'responses', 'replies', etc. which may be inclusive of packets. As referred to herein and in the claims, the term 'packet' may be used in a generic sense to include packets, frames, segments, datagrams, and/or any other generic units that may be used to transmit communications in a network environment. Generally, a packet is a formatted unit of data that can contain control or routing information (e.g., source and destination address, source and destination port, etc.) and data, which is also sometimes referred to as a 'payload', 'data payload', and variations thereof. In some embodiments, control or routing information, management information, or the like can be included in packet fields, such as within header(s) and/or trailer(s) of packets. Internet Protocol (IP) addresses discussed herein and in the claims can include any IP version 4 (IPv4) and/or IP version 6 (IPv6) addresses.

To the extent that embodiments presented herein relate to the storage of data, the embodiments may employ any number of any conventional or other databases, data stores or storage structures (e.g., files, databases, data structures, data or other repositories, etc.) to store information.

Note that in this Specification, references to various features (e.g., elements, structures, nodes, modules, components, engines, logic, steps, operations, functions, characteristics, etc.) included in 'one embodiment', 'example embodiment', 'an embodiment', 'another embodiment', 'certain embodiments', 'some embodiments', 'various embodiments', 'other embodiments', 'alternative embodiment', and the like are intended to mean that any such features are included in one or more embodiments of the present disclosure, but may or may not necessarily be combined in the same embodiments.

Each example embodiment disclosed herein has been included to present one or more different features. However, all disclosed example embodiments are designed to work together as part of a single larger system or method. This disclosure explicitly envisions compound embodiments that combine multiple previously-discussed features in different example embodiments into a single system or method.

Note also that a module, engine, client, controller, function, logic or the like as used herein in this Specification, can be inclusive of an executable file comprising instructions that can be understood and processed on a server, computer, processor, machine, compute node, combinations thereof, or the like and may further include library modules loaded during execution, object files, system files, hardware logic, software logic, or any other executable modules.

It is also noted that the operations and steps described with reference to the preceding figures illustrate only some of the possible scenarios that may be executed by one or more entities discussed herein. Some of these operations may be deleted or removed where appropriate, or these steps may be modified or changed considerably without departing from the scope of the presented concepts. In addition, the timing and sequence of these operations may be altered considerably and still achieve the results taught in this disclosure. The preceding operational flows have been offered for purposes of example and discussion. Substantial flexibility is provided by the embodiments in that any suitable arrangements, chronologies, configurations, and timing mechanisms may be provided without departing from the teachings of the discussed concepts.

As used herein, unless expressly stated to the contrary, use of the phrase 'at least one of', 'one or more of', 'and/or', variations thereof, or the like are open-ended expressions that are both conjunctive and disjunctive in operation for any and all possible combination of the associated listed items. For example, each of the expressions 'at least one of X, Y and Z', 'at least one of X, Y or Z', 'one or more of X, Y and Z', 'one or more of X, Y or Z' and 'X, Y and/or Z' can mean any of the following: 1) X, but not Y and not Z; 2) Y, but not X and not Z; 3) Z, but not X and not Y; 4) X and Y, but not Z; 5) X and Z, but not Y; 6) Y and Z, but not X; or 7) X, Y, and Z.

Additionally, unless expressly stated to the contrary, the terms 'first', 'second', 'third', etc., are intended to distinguish the particular nouns they modify (e.g., element, condition, node, module, activity, operation, etc.). Unless expressly stated to the contrary, the use of these terms is not intended to indicate any type of order, rank, importance, temporal sequence, or hierarchy of the modified noun. For example, 'first X' and 'second X' are intended to designate two 'X' elements that are not necessarily limited by any order, rank, importance, temporal sequence, or hierarchy of the two elements. Further as referred to herein, 'at least one of' and 'one or more of' can be represented using the '(s)' nomenclature (e.g., one or more element(s)).

In one form, a method performed in connection with a cloud or datacenter environment is provided. The method comprises: obtaining target application telemetry data and external telemetry data associated with one or more correlation identifiers included in one or more network communications provided to a target application in the cloud or datacenter environment; and aggregating the target application telemetry data and the external telemetry data based on the one or more correlation identifiers to generate an end-to-end distributed trace associated with the one or more network communications.

In one example, the method further comprises: displaying the end-to-end distributed trace.

In one example, the one or more network communications comprise a synthetic request and a network probe; and obtaining the target application telemetry data and the external telemetry data includes obtaining the target application telemetry data from the target application responsive to the synthetic request and obtaining the external telemetry data from an agent that provided the one or more network communications to the target application responsive to the network probe.

In one example, the one or more correlation identifiers are one or more unique trace identifiers associated with the end-to-end distributed trace. In a further example, the end-to-end distributed trace includes one or more spans, each span associated with a unique span identifier.

In one example, obtaining the external telemetry data includes: obtaining external service telemetry data associated with the one or more correlation identifiers. In another example, obtaining the external telemetry data includes: obtaining network path telemetry data associated with the one or more correlation identifiers.

In one example, the method further comprises: associating metadata of an agent that provided the one or more network communications to the target application, with the end-to-end distributed trace. In a further example, associating the metadata of the agent with the end-to-end distributed trace includes: associating a location of the agent with the end-to-end distributed trace. In another further example, associating the metadata of the agent with the end-to-end distributed trace includes: associating a network service provider of the agent with the end-to-end distributed trace.

In one example, the method further comprises: based on the end-to-end distributed trace, automatically implementing a network configuration change in the cloud or datacenter environment.

In another form, an apparatus is provided. The apparatus comprises: a network interface configured to obtain or provide network communications; and one or more processors coupled to the network interface, wherein the one or more processors are configured to: obtain target application telemetry data and external telemetry data associated with one or more correlation identifiers included in one or more network communications provided to a target application in a cloud or datacenter environment; and aggregate the target application telemetry data and the external telemetry data based on the one or more correlation identifiers to generate an end-to-end distributed trace associated with the one or more network communications.

In another form, one or more non-transitory computer readable storage media are provided. The non-transitory computer readable storage media are encoded with instructions that, when executed by a processor, cause the processor to: obtain target application telemetry data and external telemetry data associated with one or more correlation identifiers included in one or more network communications provided to a target application in a cloud or datacenter environment; and aggregate the target application telemetry data and the external telemetry data based on the one or more correlation identifiers to generate an end-to-end distributed trace associated with the one or more network communications.

One or more advantages described herein are not meant to suggest that any one of the embodiments described herein necessarily provides all of the described advantages or that all the embodiments of the present disclosure necessarily provide any one of the described advantages. Numerous other changes, substitutions, variations, alterations, and/or modifications may be ascertained to one skilled in the art and it is intended that the present disclosure encompass all such changes, substitutions, variations, alterations, and/or modifications as falling within the scope of the appended claims.

What is claimed is:

1. A method performed in connection with a cloud or datacenter environment, comprising:
   obtaining target application telemetry data and external telemetry data associated with one or more correlation identifiers included in network communications provided from an agent to a target application in the cloud or datacenter environment, wherein the network communications comprise synthetic requests initiating transactions on the target application to generate the target application telemetry data and network probes to generate the external telemetry data, wherein the target application telemetry data includes telemetry data related to the target application processing of the synthetic requests in the network communications, wherein the external telemetry data includes telemetry data relating to entities external of the target application and the cloud or datacenter environment used for processing the synthetic requests, and wherein the target application telemetry data is obtained from the target application responsive to the synthetic requests and the external telemetry data is obtained from the agent responsive to the network probes; and
   aggregating the target application telemetry data and the external telemetry data based on the one or more correlation identifiers to generate an end-to-end distributed trace associated with the network communications.

2. The method of claim 1, further comprising:
   displaying the end-to-end distributed trace.

3. The method of claim 1, further comprising:
   changing a network configuration of the cloud or datacenter environment based on the end-to-end distributed trace.

4. The method of claim 1, wherein the one or more correlation identifiers are one or more unique trace identifiers associated with the end-to-end distributed trace.

5. The method of claim 4, wherein the end-to-end distributed trace includes one or more spans, each span associated with a unique span identifier.

6. The method of claim 1, wherein obtaining the external telemetry data includes:
   obtaining external service telemetry data associated with the one or more correlation identifiers.

7. The method of claim 1, wherein obtaining the external telemetry data includes:
   obtaining network path telemetry data associated with the one or more correlation identifiers.

8. The method of claim 1, further comprising:
   associating metadata of the agent that provided the network communications to the target application, with the end-to-end distributed trace.

9. The method of claim 8, wherein associating the metadata of the agent with the end-to-end distributed trace includes:
   associating a location of the agent with the end-to-end distributed trace.

10. The method of claim 8, wherein associating the metadata of the agent with the end-to-end distributed trace includes:
    associating a network service provider of the agent with the end-to-end distributed trace.

11. An apparatus comprising:
    a network interface configured to obtain or provide communications; and
    one or more processors coupled to the network interface, wherein the one or more processors are configured to:
      obtain target application telemetry data and external telemetry data associated with one or more correlation identifiers included in network communications provided from an agent to a target application in a cloud or datacenter environment, wherein the network communications comprise synthetic requests initiating transactions on the target application to generate the target application telemetry data and network probes to generate the external telemetry data, wherein the target application telemetry data includes telemetry data related to the target application processing of the synthetic requests in the network communications, wherein the external telemetry data includes telemetry data relating to entities external of the target application and the cloud or datacenter environment used for processing the synthetic requests, and wherein the target application telemetry data is obtained from the target application responsive to the synthetic requests and the external telemetry data is obtained from the agent responsive to the network probes; and
      aggregate the target application telemetry data and the external telemetry data based on the one or more correlation identifiers to generate an end-to-end distributed trace associated with the network communications.

12. The apparatus of claim 11, wherein the one or more processors are further configured to:
    display the end-to-end distributed trace.

13. The apparatus of claim 11, wherein the one or more processors are further configured to:
    change a network configuration of the cloud or datacenter environment based on the end-to-end distributed trace.

14. The apparatus of claim 11, wherein the one or more correlation identifiers are one or more unique trace identifiers associated with the end-to-end distributed trace.

15. The apparatus of claim 14, wherein the end-to-end distributed trace includes one or more spans, each span associated with a unique span identifier.

16. One or more non-transitory computer readable storage media encoded with instructions that, when executed by a processor, cause the processor to:
    obtain target application telemetry data and external telemetry data associated with one or more correlation identifiers included in network communications provided from an agent to a target application in a cloud or datacenter environment, wherein the network communications comprise synthetic requests initiating transactions on the target application to generate the target application telemetry data and network probes to generate the external telemetry data, wherein the target application telemetry data includes telemetry data related to the target application processing of the synthetic requests in the network communications, wherein the external telemetry data includes telemetry data relating to entities external of the target application and the cloud or datacenter environment used for processing the synthetic requests, and wherein the target application telemetry data is obtained from the target application responsive to the synthetic requests and the external telemetry data is obtained from the agent responsive to the network probes; and aggregate the target application telemetry data and the external telemetry data based on the one or more correlation identifiers to generate an end-to-end distributed trace associated with the network communications.

17. The one or more non-transitory computer readable storage media of claim 16, wherein the instructions further cause the processor to:
    display the end-to-end distributed trace.

18. The one or more non-transitory computer readable storage media of claim 16, wherein the instructions further cause the processor to:
    change a network configuration of the cloud or datacenter environment based on the end-to-end distributed trace.

19. The one or more non-transitory computer readable storage media of claim 16, wherein the one or more correlation identifiers are one or more unique trace identifiers associated with the end-to-end distributed trace, and wherein the end-to-end distributed trace includes one or more spans, each span associated with a unique span identifier.

20. The one or more non-transitory computer readable storage media of claim 16, wherein, in obtaining the external telemetry data, the instructions cause the processor to:
    obtain external service telemetry data associated with the one or more correlation identifiers.

* * * * *